US012794144B2

(12) United States Patent
Hamel et al.

(10) Patent No.: US 12,794,144 B2
(45) Date of Patent: Nov. 10, 2026

(54) ADDITIVELY MANUFACTURED CONNECTED SLOT ARRAY (CSA) ANTENNA

(71) Applicant: BAE Systems Information and Electronic Systems Integration Inc., Nashua, NH (US)

(72) Inventors: Robert C. Hamel, Southwick, MA (US); Alexander D. Johnson, Wilmington, MA (US); Jacob Tamasy, Nashua, NH (US); James F. Fung, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 142 days.

(21) Appl. No.: 18/433,927

(22) Filed: Feb. 6, 2024

(65) Prior Publication Data

US 2025/0253541 A1 Aug. 7, 2025

(51) Int. Cl.
*H01Q 21/06* (2006.01)
*H01Q 21/00* (2006.01)

(52) U.S. Cl.
CPC ....... *H01Q 21/0087* (2013.01); *H01Q 21/065* (2013.01)

(58) Field of Classification Search
CPC ............. H01Q 21/0087; H01Q 21/065; H01Q 19/021; H01Q 21/064; H01Q 21/24
See application file for complete search history.

(56) References Cited

U.S. PATENT DOCUMENTS 6,188,368 B1 * 2/2001 Koriyama .............. H01Q 13/10 343/770
6,670,930 B2 * 12/2003 Navarro ............. H01Q 21/0093 343/700 MS (Continued)

FOREIGN PATENT DOCUMENTS

AU 2015329937 A 4/2017
EP 1307947 A1 5/2003

(Continued)

OTHER PUBLICATIONS

Van Katwijk, Sander and Cavallo, Daniele, "Analysis and design of connected slot arrays with artificial dielectrics," IEEE International Symposium on Phased Array Systems and Technology, (2019). 6 pages.

(Continued)

*Primary Examiner* — Dameon E Levi
*Assistant Examiner* — Jordan E. DeWitt
(74) *Attorney, Agent, or Firm* — Gary McFaline

(57) ABSTRACT

An antenna assembly includes a conductive ground plane, a ground shield extending vertically above from the ground plane, and a feed line extending vertically upwards from an opening within the ground plane, without contacting the ground plane. The antenna assembly further includes a first conductive element in contact with an upper surface of the ground shield, and a second conductive element in contact with an upper surface of the feed line, with a slot between the first conductive element and the second conductive element. In an example, the first and second conductive elements are at least in part coplanar, and at least in part on a horizontal plane that is substantially parallel to the ground plane, and separated from the ground plane by a layer of dielectric material.

12 Claims, 10 Drawing Sheets

(56) References Cited

U.S. PATENT DOCUMENTS

| | | | | |
|---|---|---|---|---|
| 7,994,997 | B2 | 8/2011 | Livingston et al. | |
| 8,441,404 | B2 | 5/2013 | Chiang et al. | |
| 8,717,245 | B1 * | 5/2014 | Krivokapic | H01Q 5/378 343/807 |
| 8,947,310 | B2 * | 2/2015 | Cheng | H01Q 5/371 343/770 |
| 9,246,228 | B2 | 1/2016 | Lee et al. | |
| 11,128,056 | B2 | 9/2021 | Rogers | |
| 2003/0146878 | A1 * | 8/2003 | Mikkola | H01Q 9/045 343/702 |
| 2004/0183731 | A1 * | 9/2004 | Darden | H01Q 1/22 343/702 |
| 2008/0165065 | A1 * | 7/2008 | Hill | H01Q 13/10 343/702 |
| 2013/0120210 | A1 * | 5/2013 | Zeiger | H01Q 9/045 343/841 |
| 2013/0214046 | A1 * | 8/2013 | Choi | H01Q 21/24 343/810 |
| 2016/0301129 | A1 * | 10/2016 | Ying | H01Q 21/08 |
| 2016/0315397 | A1 * | 10/2016 | Sawa | H01Q 1/38 |
| 2020/0373673 | A1 * | 11/2020 | Hashemi | H01Q 21/0087 |
| 2021/0313706 | A1 * | 10/2021 | Hiramatsu | H01Q 15/006 |
| 2022/0085493 | A1 * | 3/2022 | Jia | H01Q 1/243 |
| 2024/0283168 | A1 * | 8/2024 | Tamasy | H01Q 21/062 |
| 2025/0253541 | A1 * | 8/2025 | Hamel | H01Q 21/064 |

FOREIGN PATENT DOCUMENTS

| | | | | |
|---|---|---|---|---|
| EP | 2304846 | A | 4/2011 | |
| EP | 3387706 | A1 | 10/2018 | |
| EP | 3654448 | A1 | 5/2020 | |
| GB | 2535216 | A | 8/2016 | |
| GB | 2561445 | A | 10/2018 | |
| WO | 2016055657 | A3 | 4/2016 | |
| WO | 2018063762 | A1 | 4/2018 | |
| WO | 2018077408 | A1 | 5/2018 | |
| WO | 2019154501 | A1 | 8/2019 | |
| WO | WO-2020040259 | A1 * | 2/2020 | H01Q 19/005 |
| WO | 2022055646 | A1 | 3/2022 | |
| WO | 2022186835 | A1 | 9/2022 | |

OTHER PUBLICATIONS

Cavallo, et al., “A 5:1 connected slot array loaded with artificial dielectric layers,” IEEE International Symposium on Phased Array Systems and Technology (2016), 5 pages.

* cited by examiner

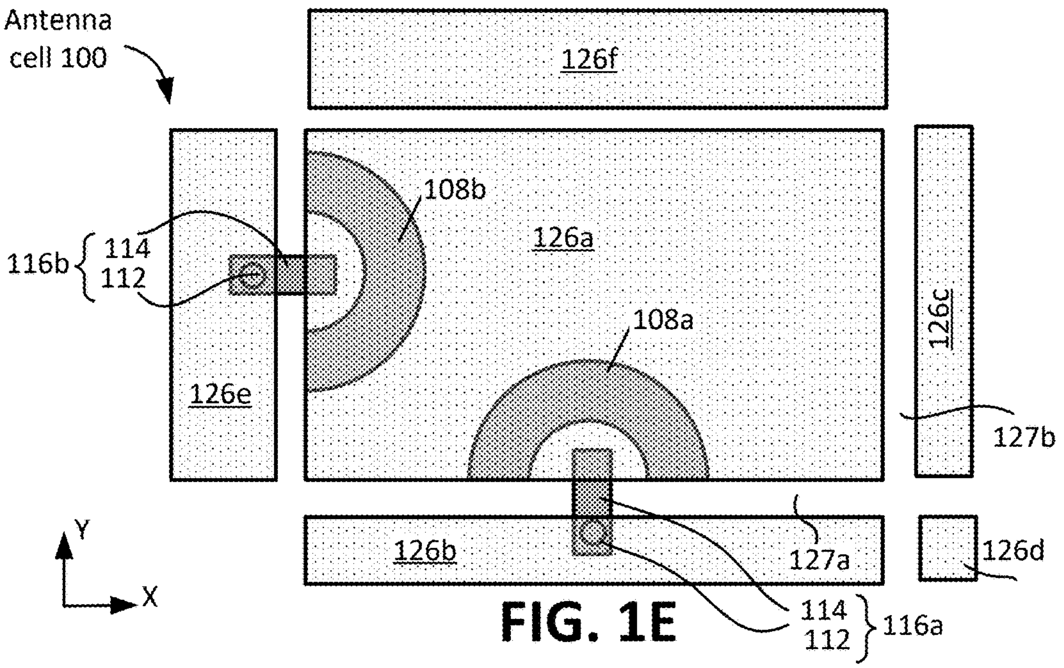
FIG. 1E
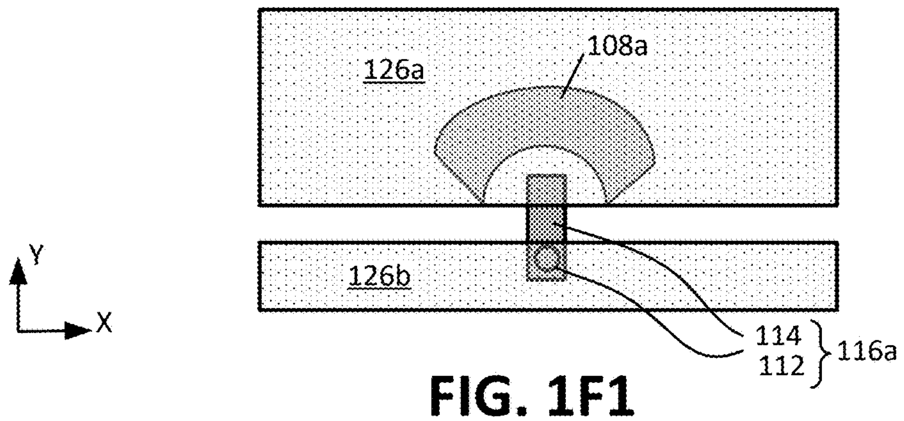
FIG. 1F1
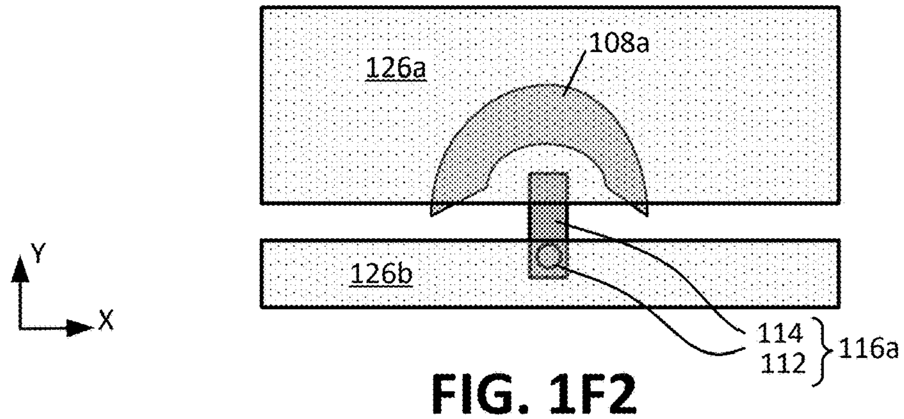
FIG. 1F2

ADDITIVELY MANUFACTURED CONNECTED SLOT ARRAY (CSA) ANTENNA

FIELD OF DISCLOSURE

The present disclosure relates to antennas, and more particularly, to connected slot array antennas.

BACKGROUND

An antenna transduces electromagnetic (EM) waves to radio frequency (RF) electrical signals. Antennas can be arranged in arrays to provide wideband and ultra-wideband (UWB) operations, such as in conjunction with radar and tracking systems, high data rate communication links, and multi-waveform, multi-function front end systems. There remain a number of non-trivial challenges with respect to designing and manufacturing antennas.

BRIEF DESCRIPTION OF THE DRAWINGS

FIGS. 1A, 1B, 1C, 1D, and 1E illustrate various views of a section of an antenna cell that is a part of a connected slot array (CSA) antenna array, in accordance with an embodiment of the present disclosure.

FIGS. 1F1 and 1F2 illustrate alternate example shapes of a ground shield of the antenna cell of FIGS. 1A-1E, in accordance with an embodiment of the present disclosure.

Figure 1A:
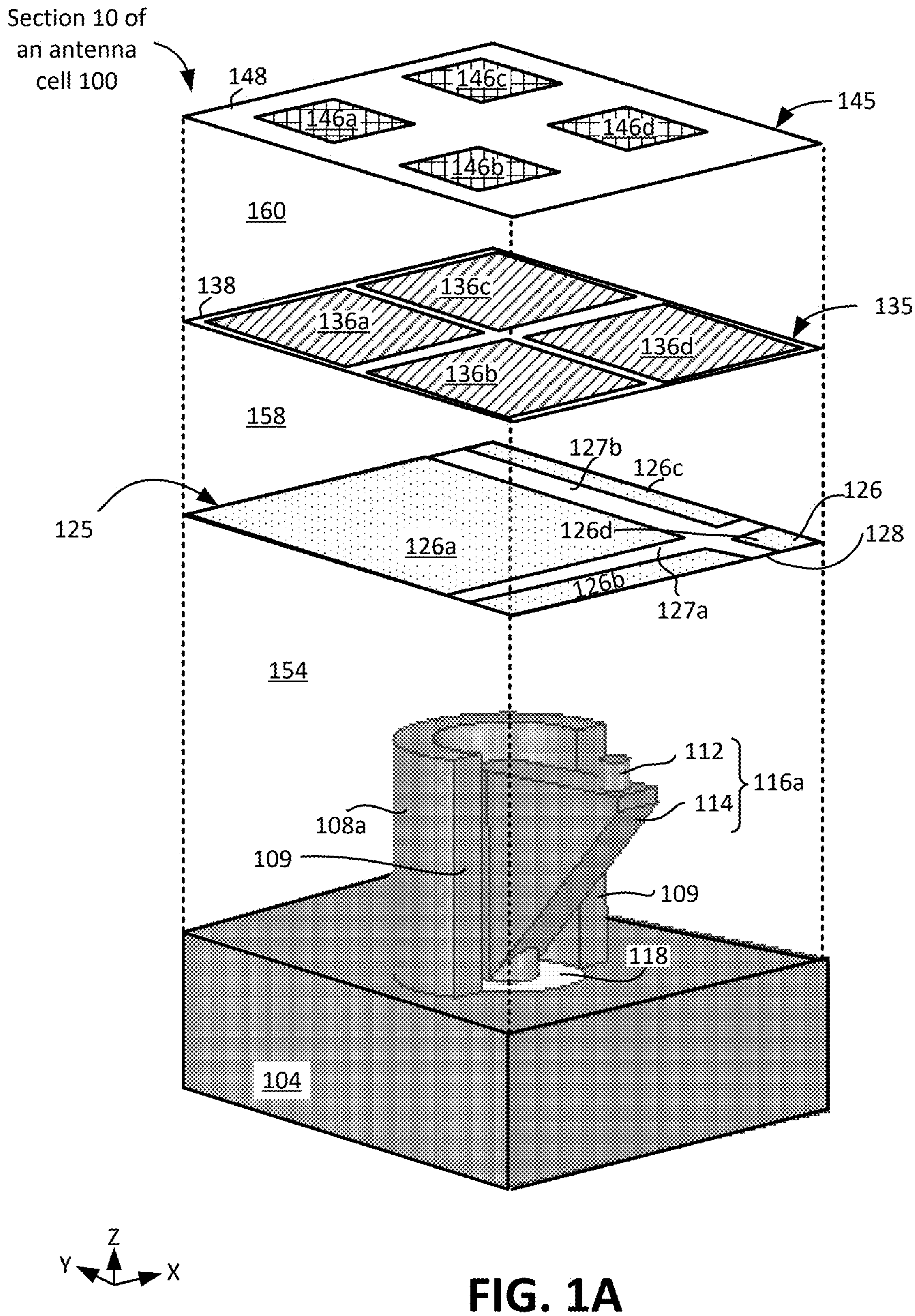

Although the following detailed description will proceed with reference being made to illustrative examples, many alternatives, modifications, and variations thereof will be apparent in light of this disclosure.

DETAILED DESCRIPTION

Connected slot array (CSA) antenna structures are disclosed. In an example, one or more sections of such an antenna structure are additively manufactured, so as to allow for a desired form factor for one or more conductive sections of the antenna structure, as well as tuning a height of one or more layers of dielectric material of the antenna structure, which in turn allows to tune one or more parameters of interest of the antenna structure.

A CSA antenna structure may include one or more unit cells. In an example, a unit cell of a CSA antenna structure comprises a conductive ground plane, a ground shield extending vertically above from the ground plane, a feed line extending vertically upwards from an opening within the ground plane without contacting the ground plane, a first conductive element in contact with an upper surface of the ground shield, and a second conductive element in contact with an upper surface of the feed line, with a slot between the first conductive element and the second conductive element. In an example, a width of the slot may be tuned such that an electromagnetic field across the slot and between the first and second conductive elements excites the slot, resulting in an electromagnetic radiation by the slot. Thus, the slot excited by the electromagnetic field forms the radiating element of the antenna cell. The ground shield comprises a conductive wall that at least partially wraps around the feed line, and prevents or otherwise reduces electromagnetic coupling between the feed line and one or more adjacent feed lines. For a dual polarization antenna unit cell, another such ground shield and another corresponding feed line is provided. An antenna array includes several such antenna unit cells, including a plurality of slots. In an example, the slots are connected to each other, to form the connected slot array or CSA antenna structure.

In an example, at least portions of the antenna structure or assembly may be additively manufactured. In one embodiment, a method of manufacturing an antenna structure or assembly comprises additively manufacturing a continuous and monolithic structure that includes (i) a ground plane, (ii) a ground shield extending vertically above from and in contact with from the ground plane, and (iii) a feed line extending vertically above from and in contact with the ground plane. In an example, additively manufacturing the continuous and monolithic structure comprises printing the structure using a three-dimensional (3D) printing process. The method further includes providing a layer of dielectric material above the ground plane and at least in part around the ground shield and the feed line. In an example, providing the layer of dielectric material comprises providing the layer of dielectric material using a dielectric material foaming process. The method further includes providing a first conductive element and a second conductive element above the layer of dielectric material, such that the first conductive element is in contact with an upper surface of the ground shield, and the second conductive element in contact with an upper surface of the feed line. The method further includes removing at least a part of the ground plane, to form an opening around a portion of the feed line extending through the ground plane, such that the feed line is no longer in contact with the ground plane.

Numerous configurations and variations will be apparent in light of this disclosure.

General Overview

As mentioned herein above, there remain a number of non-trivial challenges with respect to designing and manufacturing antenna assemblies. For example, an antenna structure generally includes conductive features and layers of dielectric material arranged in a printed circuit board (PCB) configuration, sometimes called a PCB antenna. Various antenna parameters of interest, such as antenna gain and bandwidth, depend on shapes and/or dimensions of the conductive features and/or layers of dielectric material. However, PCB antennas are prefabricated, and thickness of such a PCB may be pre-defined or otherwise fixed. As such, it not possible to fine-tune the thickness of the PCB to achieve a desired antenna characteristic. Similarly, it may not be possible to readily alter shapes and/or dimensions of the conductive features of a given PCB antenna, as these conductive features are also prefabricated to specific shapes and/or dimensions.

Accordingly, techniques are described herein to form a connected slot array (CSA) antenna structure using additive manufacturing processes, wherein the additive manufacturing processes allow for fine tuning of the shapes and/or dimensions of various conductive features and/or layers of dielectric material, which in turn allows for tuning of one or more parameters of interest of the antenna structure.

In one embodiment, a unit cell of a CSA antenna array comprises a conductive ground plane, a conductive ground shield extending vertically above from the ground plane, and a conductive feed line extending vertically upwards from an opening within the ground plane. In an example, the ground plane, the ground shield, and the feed line comprise conductive material, such as a metal and/or an alloy thereof (or a metal coating on a non-metal material). Note that a single polarized antenna cell comprises a single ground cell and a corresponding feed line. However, a dual polarized antenna cell comprises two such ground shields and two corresponding feed lines. The CSA antenna array comprises a plurality of such antenna cells.

In one embodiment, the ground shield is in contact with the ground plane. As described below, in an example, the ground plane and the ground shield are formed by a same deposition process, such as an additive manufacturing process (such as a 3D printing process). Accordingly, there may not be an interface (such as a seam) between the ground plane and the ground shield. For example, the ground plane and the ground shield may form a continuous and monolithic structure (e.g., a continuous body of copper). In one embodiment, the ground shield is a continuous wall, extending substantially orthogonally upwards from the ground plane. In an example, the wall of the ground shield is partially around the corresponding feed line, e.g., partially wraps the feed line. In such an example, the ground shield prevents, or at least reduces electromagnetic coupling of the feed line to one or more adjacent feed lines of the antenna array. Accordingly, in an example, ground shields are also referred to herein as feed shields, or as feed line shields.

In one embodiment, the feed line comprises a main body and an extension portion. The extension portion and the body are monolithic and continuous, such that there is no interface (such as a seam) therebetween. The ground plane has an opening that extends through the ground plane. In one embodiment, a lower portion of the feed line extends through the opening, without making any contact with the ground plane. In an example, the body of the feed line has a triangular shape, although the body can have another appropriate shape, such as a cantilever shape or an inverted "L" shape. In an example where the unit antenna cell has two feed lines, a first feed line and a second feed line may substantially be orthogonal to each other (e.g., see FIG. 1E), and may be at least in part shielded by corresponding first and second ground shields, respectively.

In one embodiment, the antenna cell comprises a slot or aperture layer comprising a plurality of conductive elements. The conductive elements of the aperture layer comprise one or more metals and/or alloys thereof, or non-metal coated with one or more metals and/or alloys thereof. In an example, the conductive elements of the aperture layer are on a same horizontal plane above the ground plane, and are separated by a lower layer of dielectric material from the ground plane. In an example, the conductive elements are on a plane that is substantially parallel to a plane of the ground plane.

The conductive elements of the aperture layer are disconnected or disjoint from each other. For example, two such adjacent conductive elements are separated by a corresponding slot. The antenna array comprising multiple such unit cells have multiple such slots, where the slots are all connected to each other. Because all the slots of the antenna array are connected to each other, the antenna array is also referred to as the connected slot array or CSA antenna array. A slot within the aperture layer is defined by a lack of conductive element. The slots may be filled with dielectric material, or may be left as a void filled with air, gas, or may be vacuum.

For a given pair of ground shield and corresponding feed line, the ground shield is in contact with a first conductive element of the aperture layer, and the feed line is in contact with a second conductive element of the aperture layer. Note that a conductive element can be in contact with more than one ground shield and/or more than one feed line of the antenna array (e.g., see FIG. 2C below). In one embodiment, at least a part of the feed line is below the first conductive element, another part of the feed line is below the slot between the first and second conductive elements, and yet another part of the feed line is below the second conductive element. For example, the above described body of the feed line extends from below the first conductive element to below the second conductive element. The extension portion of the feedline is on a portion of the body that is below the second conductive element. An upper surface of the extension portion is in contact with the second conductive element, and a lower surface of the extension portion is in contact with the body, in an example.

In one embodiment, the antenna cell comprises a first impedance matching layer, such as a wide angle impedance matching (WAIM) layer, comprising a plurality of conductive components. In one embodiment, the antenna cell further comprises a second impedance matching layer above the first impedance matching layer. The second impedance matching layer is, for example, another WAIM layer, comprising another plurality of conductive components. Although two such impedance matching layers are described, in an example, the antenna cell may comprise one, three, or a higher number of such impedance matching layers. The impedance matching layers provide frequency selective surface matching and/or impedance matching components in the antenna cell.

In one embodiment, the first impedance matching layer is supported above the aperture layer by an intermediate layer of dielectric material, which is between the aperture layer and the first impedance matching layer. In one embodiment, the second impedance matching layer is supported above the first impedance matching layer by an upper layer of dielectric material, which is between the first impedance matching layer and the second impedance matching layer.

In one embodiment, the above described lower, intermediate, and/or upper layers of dielectric material may be formed using corresponding additive processes, such as corresponding foaming processes. Similarly, as will be described below, the ground plane, the ground shield, and the feed line may be formed using an additive process, such as a three-dimensional (3D) printing process. In an example, because of the flexibility offered by additive manufacturing processes, heights of the ground plane, the ground shield, the feed line, as well as the lower, intermediate, and/or the upper layers of dielectric material may be fine-tuned, e.g., to thereby control one or more antenna characteristics. Accordingly, in an example, linear frequency scalability may be achieved, e.g., by controlling one or more of the above described heights.

Materials that are "compositionally different" or "compositionally distinct" as used herein refers to two materials that have different chemical compositions. This compositional difference may be, for instance, by virtue of an element that is in one material but not the other (e.g., copper is compositionally different than an alloy of copper), or by way of one material having all the same elements as a second material but at least one of those elements is intentionally provided at a different concentration in one material relative to the other material (e.g., two copper alloys each having copper and tin, but with different percentages of copper, are also compositionally different). If two materials are elementally different, then one of the materials has an element that is not in the other material (e.g., pure copper is elementally different than an alloy of copper).

It should be readily understood that the meaning of "above" and "over" in the present disclosure should be interpreted in the broadest manner such that "above" and "over" not only mean "directly on" something but also include the meaning of over something with an intermediate feature or a layer therebetween. As will be appreciated, the use of terms like "above" "below" "beneath" "upper" "lower" "top" and "bottom" are used to facilitate discussion and are not intended to implicate a rigid structure or fixed orientation; rather such terms merely indicate spatial relationships when the structure is in a given orientation.

Architecture

Figure 1B:
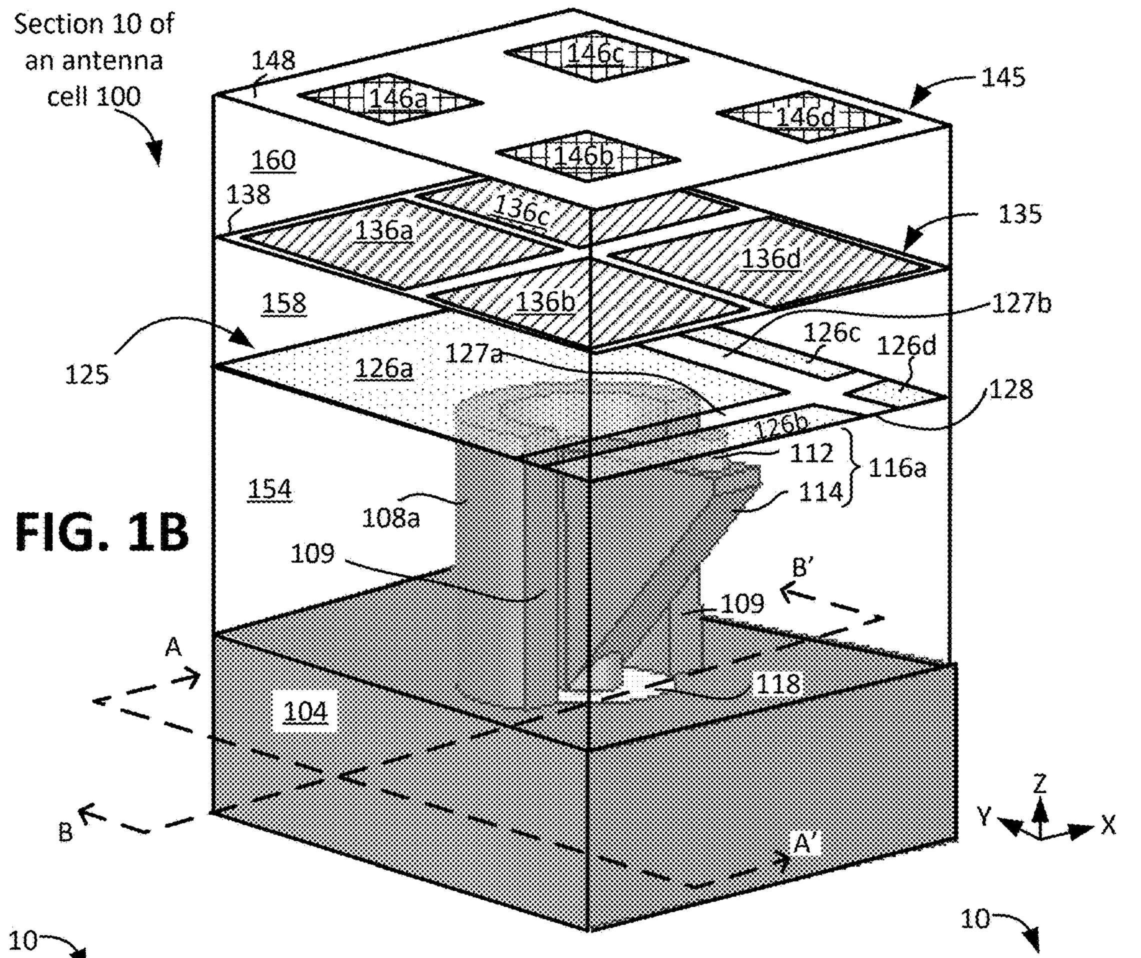
Figure 1C:
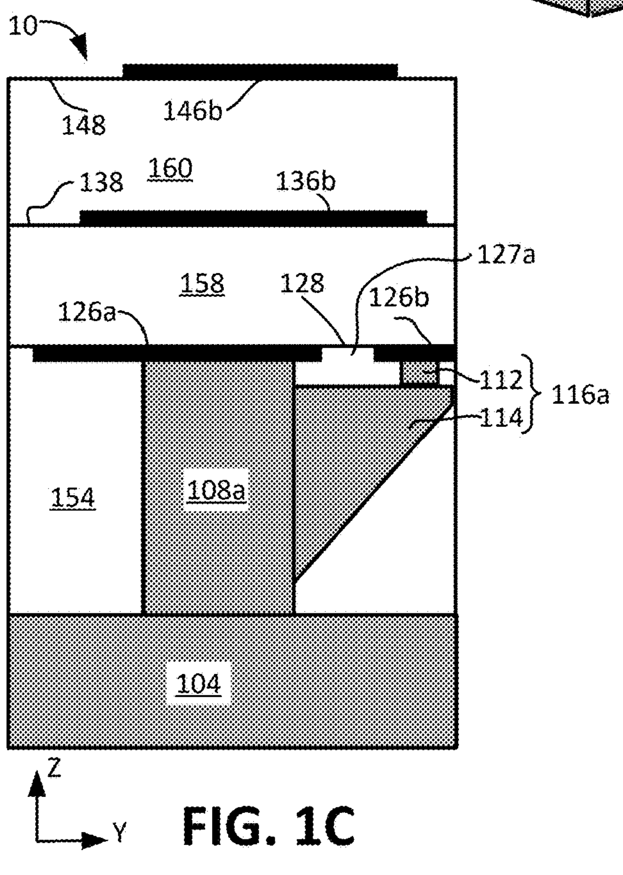
Figure 1D:
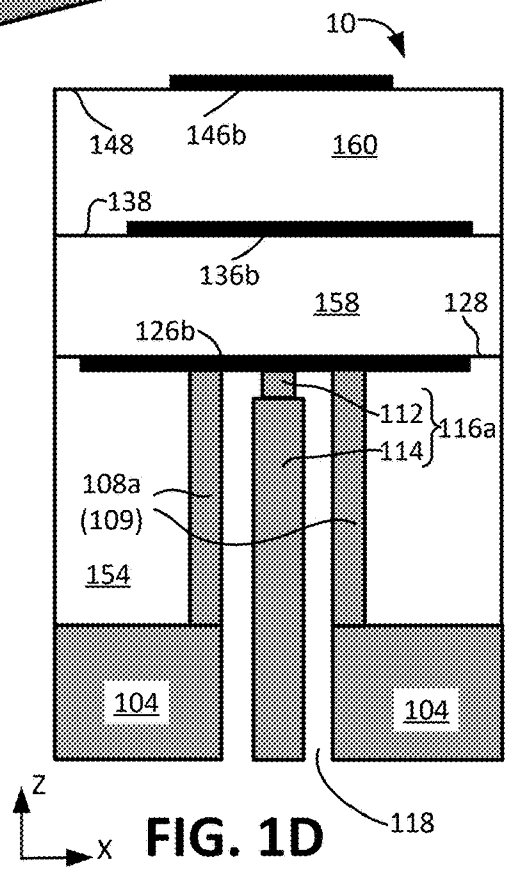

FIG. 1A illustrates an exploded view, FIG. 1B illustrates a perspective view, FIGS. 1C and 1D illustrate cross-sectional views, and FIG. 1E illustrates a plan view of a section 10 of an antenna cell 100, where the antenna cell 100 is a part of a connected slot array (CSA) antenna array, in accordance with an embodiment of the present disclosure. As will be described below, the CSA antenna array may be additively manufactured and have modular apertures or slots, and hence, the CSA antenna array is also referred to herein as an additively manufactured modular aperture based connected slot array (AMMA-CSA) antenna assembly. While FIGS. 1A-1E illustrate the section 10 of a single antenna cell 100, FIGS. 2A-2D discussed below illustrate the corresponding CSA antenna array 200.

Note that in FIG. 1E, some of the sections of the antenna cell 100 are not illustrated, such as an impedance matching layer 135 comprising a plurality of conductive components 136, and another impedance matching layer 145 comprising another plurality of conductive components 146. Furthermore, a slot or aperture layer 125 (e.g., comprising a plurality of conductive elements 126) is illustrated as being semi-transparent in FIG. 1E, although the aperture layer 125 in practice may not be semi-transparent.

Furthermore, note that in FIGS. 1A-1E, the aperture layer 125, the impedance matching layer 135, and the impedance matching layer 145 comprise corresponding conductive sections 126, 136, and 146. The sections 126 of the aperture layer 125 are referred to herein as conductive "elements"; whereas the sections 136 and 146 of the impedance matching layers 135, 145, respectively, are referred to herein as conductive "components," e.g., to readily differentiate between the elements 126 and the components 136, 146. Note that the elements 126 and the components 136, 146 may be compositionally and/or elementally the same (or different), and/or may have similar (or different) shape and/or size, as will be described below.

Referring to FIGS. 1A-1E, the antenna cell 100 is a unit antenna cell, and is also referred to as a cell 100, and only a portion 10 of the cell 100 is illustrated in FIGS. 1A-1D. For example, in FIGS. 1A-1D, a single ground shield 108*a* of the section 10 of the antenna cell 100 is illustrated. In contrast, the plan view of FIG. 1E illustrates two ground shields 108*a* and 108*b*, which is combination forms the antenna cell 100.

The cell 100 comprises a conductive ground plane 104. For example, the ground plane 104 comprises material is at least partially electrically conductive (e.g., comprises one or more metals and/or alloys thereof). In another example, the material of the ground plane 104 is at least partially non-conductive and at least partially plated with another conductive material (e.g., a metal plating). In an example, the ground plane 104 comprises an appropriate metal such as copper, and/or an alloy thereof.

In one embodiment, a ground shield 108*a* extends vertically above from the ground plane 104. The ground shield 108*a* comprises conductive material, e.g., one or more metals, and/or alloys thereof. The ground shield 108*a* is in contact with the ground plane 104. As will be described below, in an example, the ground plane 104 and the ground shield 108*a* are formed by a same deposition process, such as an additive manufacturing process (such as a 3D printing process). Accordingly, there may not be an interface (such as a seam) between the ground plane 104 and the ground shield 108*a*. For example, the ground plane 104 and the ground shield 108*a* may form a continuous and monolithic structure, without any interface therebetween.

In one embodiment, the ground shield 108*a* is a continuous wall, having a semicircular plan or top view (see FIG. 1E for the plan view of the ground shield 108*a*). The wall of the ground shield 108*a* has two ends, labelled as 109 in FIGS. 1A and 1B. The wall of the ground shield 108*a* extends vertically above from the ground plane 104. In an example, the wall of the ground shield 108*a* extends substantially orthogonally from the ground plane 104 (such as at an angle of 90 degrees, e.g., with a margin of at most 5 degrees, or 3 degrees, or 1 degree of error).

In FIGS. 1A-1E, the plan view of the ground shield 108*a* is illustrated to be a semicircle. However, the ground shield 108*a* need not always be a semicircle. FIGS. 1F1 and 1F2 illustrate alternate example shapes of the ground shield 108*a* of the antenna cell 100 of FIGS. 1A-1E, in accordance with an embodiment of the present disclosure. For example, comparing FIG. 1E with FIGS. 1F1 and 1F2, while the ground shield 108*a* in FIG. 1E has a semicircular cross-sectional plan view, the ground shield 108*a* in FIGS. 1F1 and 1F2 doesn't have such a semicircular cross-sectional plan view. The cross-sectional plan view of the ground shield 108*a* may be implementation specific, and vary from one embodiment to another embodiment.

Referring again to FIGS. 1A-1E, the wall of the ground shield 108*a* is partially around a feed line 116*a*, e.g., partially wraps the feed line 116*a*. For example, the ground shield 108*a* at least in part shields or surrounds the feed line 116*a*. In such an example, the ground shield 108*a* prevents, or at least reduces electromagnetic coupling of the feed line 116*a* from one or more adjacent feed lines of the antenna array 200. For example, referring to FIG. 1E, illustrated is a ground shield 108*a* at least in part wrapping around the corresponding feed line 116*a*, and another ground shield 108*b* at least in part wrapping around another corresponding feed line 116*b*. The ground shields 108*a* and/or 108*b* prevents, or at least reduces, electromagnetic coupling between the feed lines 116*a* and 116*b*, thus reducing electromagnetic interference in the antenna array 200. Thus, the ground shield 108*a* at least in part electromagnetically isolates the corresponding feed line 116*a* from one or more other adjacent feed lines. Accordingly, in an example, ground shields are also referred to herein as feed shields, or as feed line shields. In an example, the feed lines 116*a* and 116*b* and may substantially be orthogonal to each other (as illustrated in FIG. 1E), and may be at least in part shielded by the ground shields 108*a*, 108*b*.

The feed line 116*a* comprises conductive material, such as a metal and/or an alloy thereof (or a metal coating on a non-metal material). In one embodiment, the feed line 116*a* comprises a main body 114 and an extension portion 112. The extension portion 112 and the body 114 are monolithic and continuous, such that there is no interface (such as a seam) therebetween, e.g., as the extension portion 112 and the body 114 are manufactured using a same additive metal deposition process (such as a 3D printing process).

The ground plane 104 has an opening 118 that extends through the ground plane 104. In one embodiment, a lower portion of the feed line 116*a* extends through the opening 118, without making any contact with the ground plane 104. As illustrated, the body 114 of the feed line 116 has a triangular shape, although the body 114 can have another appropriate shape, such as a cantilever shape or an inverted "L" shape.

FIG. 1C is a cross-sectional view of the section 10 of the antenna cell 100 along imaginary line A-A' of FIG. 1B, and FIG. 1D is a cross-sectional view of the section 10 of the antenna cell 100 along imaginary line B-B' of FIG. 1B, where the line B-B' passes through the opening 118 within the ground plane 104. In the view of FIG. 1C, the wall of the ground shield 108*a* is visible, with the feed line 116*a* appearing to extend out of the ground shield 108*a*. As illustrated in FIG. 1C, the extension portion 112 is above and on the body 114 of the feed line 116*a*.

In the view of FIG. 1D, the opening 118 within the ground plane 104 is visible. A lower section of the feed line 116*a* (e.g., a lower section of the body 114) extends through the opening 118, without contacting the ground plane 104. End portions 109 of the wall of the ground shield 108*a* are visible in FIG. 1D. The wall of the ground shield 108*a*, which is behind the feed line 116*a* in FIG. 1D, is not illustrated in FIG. 1D for purposes of illustrative clarity.

In one embodiment, the antenna cell 100 comprises a slot or aperture layer 125 comprising a plurality of conductive elements 126. The aperture layer 125 is illustrated as being semi-transparent in various figures, e.g., to illustrate the ground plane 104, the ground shields 108, and the feed lines 116 below the aperture layer 125, although the aperture layer 125 in practice may not be semi-transparent.

Figure 2A:
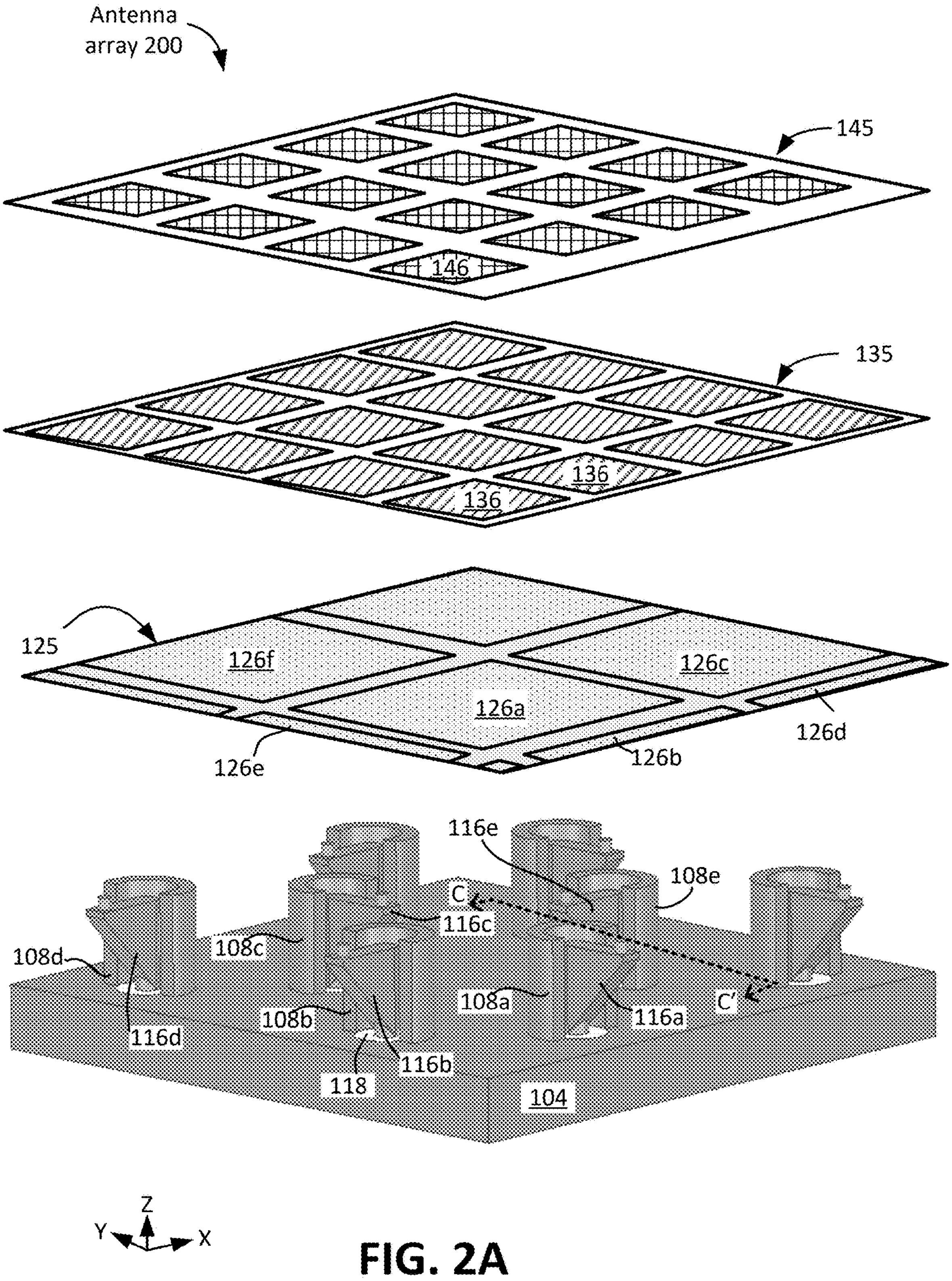
FIGS. 2A, 2B, 2C, and 2D illustrate various views a CSA antenna array comprising the antenna cell of FIGS. 1A-1E, in accordance with an embodiment of the present disclosure.

The aperture layer 125 comprises a plurality of conductive elements 126*a*, 126*b*, 126*c*, 126*d*. Although four such conductive elements 126*a*, . . . , 126*d* are illustrated in FIGS. 1A-1D, the antenna array 200 comprises more than four such conductive elements. For example, FIG. 1E illustrates six such conductive elements 126*a*, . . . , 126*f*, and FIG. 2A illustrates even a higher number of such conductive elements 126. The conductive elements 126 comprise one or more metals and/or alloys thereof, in an example. In another example, the conductive elements 126 comprise non-metal coated with one or more metals and/or alloys thereof.

The plurality of conductive elements 126*a*, 126*b*, 126*c*, 126*d* are on a same horizontal plane above the ground plane 104, and are separated by a layer of dielectric material 154 from the ground plane 104. In an example, the conductive elements 126 are on a plane that is substantially parallel to a plane of the ground plane 104.

The conductive elements 126*a*, . . . , 126*d* are disconnected or disjoint from each other. For example, two such adjacent elements are separated by a corresponding slot 127. FIGS. 1A-1B and 1E illustrate a slot 127*a* between elements 126*a* and 126*b*, and a slot 127*b* between elements 126*a* and 126*c*. Note that the slot 127*a* also extends between elements 126*c* and 126*d*, and the slot 127*b* also extends between elements 126*b* and 126*d*. The slots 127*a* and 127*b* are connected, or intersections with each other, e.g., at a junction between the four elements 126*a*, 126*b*, 126*c*, 126*d*.

The slots 127 are apertures or openings between the conductive elements 126. Because all the slots of the antenna array 200 are connected to each other (e.g., see FIG. 2A onwards), the antenna array 200 is also referred to as a connected slot array (CSA) antenna array. Thus, a slot 127 within the aperture layer 125 (also referred to as a slot layer 125) is defined by a lack of conductive element 126. The slots 127 may be filled with dielectric material, such as dielectric material 128 of the aperture layer 125, or by dielectric material 154 described below, or may be left as a void filled with air, gas, or may be vacuum.

For a given pair of ground shield 108 and corresponding feed line 116 (such as the ground shield 108*a* and the corresponding feed line 116*a*), the ground shield is in contact with a first conductive element of the aperture layer 125, and the feed line is in contact with a second conductive element of the aperture layer 125. For example, as illustrated in FIGS. 1B-1E, the ground shield 108*a* is in contact with the conductive element 126*a* of the aperture layer 125, and the feed line 116*a* (such as the extension portion 112 of the feed line 116*a*) is in contact with the conductive element 126*b* of the aperture layer 125. As illustrated in FIG. 1E, the conductive element 126*a* can be in contact with more than one ground shield, such as in contact with ground shields 108*a* and 108*b*, as will be described in further detail below with respect to FIGS. 2A-2D.

As illustrated in FIGS. 1B, 1C, and 1E, at least a part of the feed line 116*a* is below the conductive element 126*a*, another part of the feed line 116*a* is below the slot 127*a*, and yet another part of the feed line 116*a* is below the conductive element 126*b*. For example, the body 114 of the feed line 116*a* extends from below the conductive element 126*a* to below the conductive element 126*b*. The extension portion 112 of the feedline 116*a* is on a portion of the body 114 that is below the conductive element 126*b*. An upper surface of the extension portion 112 is in contact with the conductive element 126*b*, and a lower surface of the extension portion 112 is in contact with the body 114.

In one embodiment, the aperture layer 125 is supported above the ground plane 104 by dielectric material 154, which is between the aperture layer 125 and the ground plane 104. Any appropriate type of dielectric material 154 may be used, such as an appropriate dielectric material used in printed circuit boards (PCBs), a composite material comprising woven fiberglass cloth and an epoxy resin binder, glass and/or ceramic material, composite laminate, foam, epoxy, resin, and/or another appropriate dielectric material. In an example, the dielectric material 154 comprise dielectric foam material. In an example and as will be described below, the dielectric material 154 may be formed using an additive process, such as a foaming process.

In one embodiment, the antenna cell 100 comprises a first impedance matching layer 135, such as a wide angle impedance matching (WAIM) layer, comprising a plurality of conductive components 136. In one embodiment, the antenna cell 100 further comprises a second impedance matching layer 145 above the first impedance matching layer 135. The impedance matching layer 145 is, for example, another WAIM layer, comprising another plurality of conductive components 146. Although two such impedance matching layers 135 and 145 are illustrated, in an example, the antenna cell 100 may comprise one, three, or a higher number of such impedance matching layers. The impedance matching layers 135 and 145 provide frequency selective surface matching and/or impedance matching components 136, 146, respectively, in the antenna cell 100.

The impedance matching layer 135 comprises a corresponding plurality of conductive components 136*a*, 136*b*, 136*c*, 136*d*, although the antenna cell 100 may include any different number of such conductive components 136. The components 136*a*, . . . , 136*d* are separated from each other by dielectric material 138 of the layer 135. Thus, a conductive component 136*a* is not in physical contact with any adjacent conductive component 136*b*. The conductive components 136 are illustrated in FIGS. 1A-1B to have a rectangular or square shape, although other shapes are also possible. The conductive components 136 are illustrated to be larger in size compared to the conductive components 146, however a size and/or a number of conductive components 136 may be independent of (or different from) a size and/or a number of conductive components 146. The layer 135, including the conductive components 136, are on a horizontal plane that may be substantially parallel to a plane of the ground plane 104, in an example.

The impedance matching layer 145 comprises a corresponding plurality of conductive components 146*a*, 146*b*, 146*c*, 146*d*, although the antenna cell 100 may include any different number of such conductive components 146. The components 146*a*, . . . , 146*d* are separated from each other by dielectric material 148. Thus, a conductive component 146 is not in physical contact with any adjacent conductive component 146. The conductive components 146 are illustrated in FIGS. 1A-1B to have a rectangular or square shape, although other shapes are also possible. As described above, a size and/or a number of conductive components 136 may be independent of (or different from) a size and/or a number of conductive components 146. The layer 145, including the conductive components 146, are on a horizontal plane that may be substantially parallel to a plane of the ground plane 104, in an example.

As illustrated in FIG. 1B, in an example, a component 136 may be at least in part above the ground shield 108*a* and/or the feed line 116*a*. Similarly, a component 146 may be at least in part above the ground shield 108*a* and/or the feed line 116*a*. In one embodiment, the conductive components 136 and/or 146 comprise conductive material, such as one or more metals and/or alloys thereof. In an example, conductive components 136 and/or 146 comprise no-metal coated with one or more metals and/or alloys thereof.

In one embodiment, the impedance matching layer 135 is supported above the aperture layer 125 by dielectric material 158, which is between the aperture layer 125 and the impedance matching layer 135. In one embodiment, the impedance matching layer 145 is supported above the impedance matching layer 135 by dielectric material 160, which is between the impedance matching layer 135 and the impedance matching layer 145.

Any appropriate type of dielectric materials 158, 160 may be used, such as an appropriate dielectric material used in PCBs, a composite material comprising woven fiberglass cloth and an epoxy resin binder, glass and/or ceramic material, composite laminate, foam, epoxy, resin, and/or another appropriate dielectric material. In an example, the dielectric materials 158 and/or 160 comprise dielectric foam material. In an example and as will be described below, the dielectric materials 158 and/or 160 may be formed using an additive process, such as a foaming process.

In operation, the feed line 116*a* is excited by an excitation system. For example, although not illustrated in FIGS. 1A-1E, a coaxial cable may have a center conductor connected to a lower surface of the feed line 116*a*, and an outer conductor (such as the ground conductor) connected to the ground plane 104. Thus, the ground shield 108*a* may be grounded through the ground conductor of the coaxial cable, and the feed line 116*a* may be excited by the center conductor of the coaxial cable. Note that the ground shield 108*a* is in contact with the conductive element 126*a* and the feed line 116*a* is in contact with the conductive element 126*b*, with a slot or aperture 127*a* between the conductive elements 126*a* and 126*b*. In an example, a width (e.g., between the elements 126*a*, 126*b*, see FIG. 1E) of the slot 127*a* may be selected such that an electromagnetic field across the slot 127*a* and between the conductive elements 126*a* and 126*b* excites the slot 127*a*, resulting in an electromagnetic radiation by the slot 127*a*. Thus, the slot 127*a* excited by the electromagnetic field forms the radiating element of the antenna cell 100.

Note that the feed line 116*a* and the corresponding ground shield 108*a* form a first polarization, such as one of a vertical polarization (V-polarization) or a horizontal polarization (H-polarization) of the antenna cell 100. The feed line 116*b* and the corresponding ground shield 108*b* (see FIG. 1E) form a second polarization, such as the other of the V-polarization or the horizontal polarization H-polarization of the antenna cell 100. The ground shields 108*a*, 108*b*, and the feed lines 116*a*, 116*b*, in combination, form the two polarizations of the antenna cell 100.

Figure 2B:
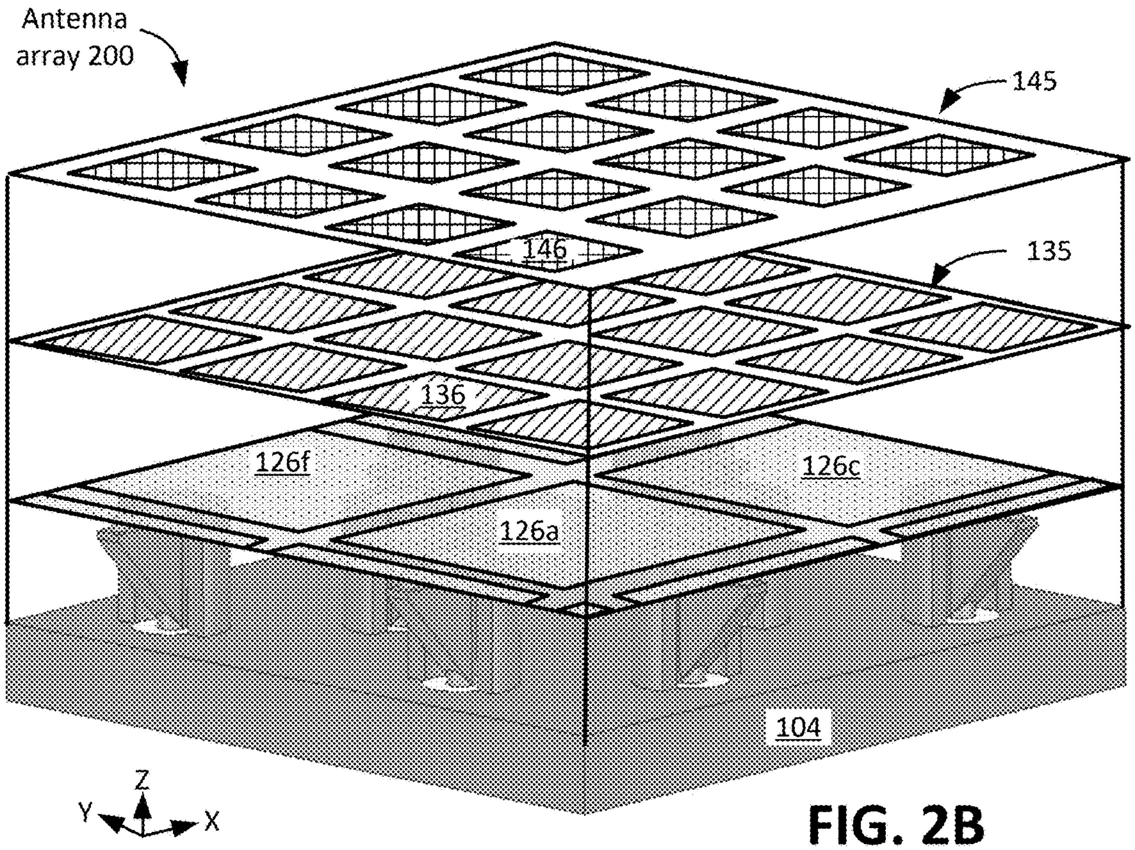
Figure 2C:
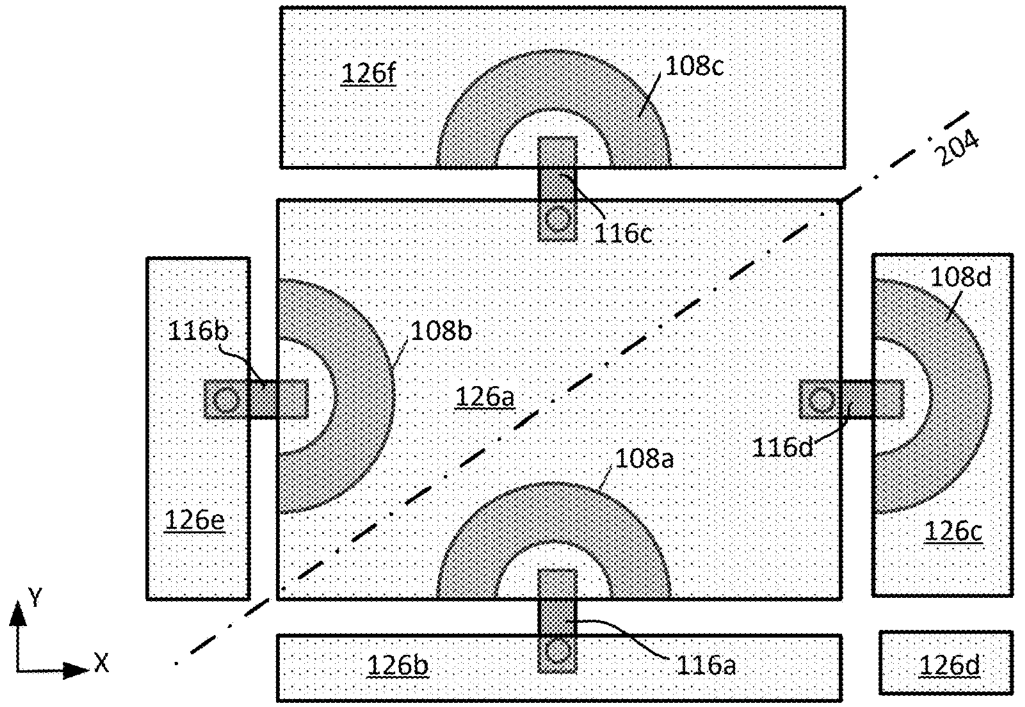
Figure 2D:
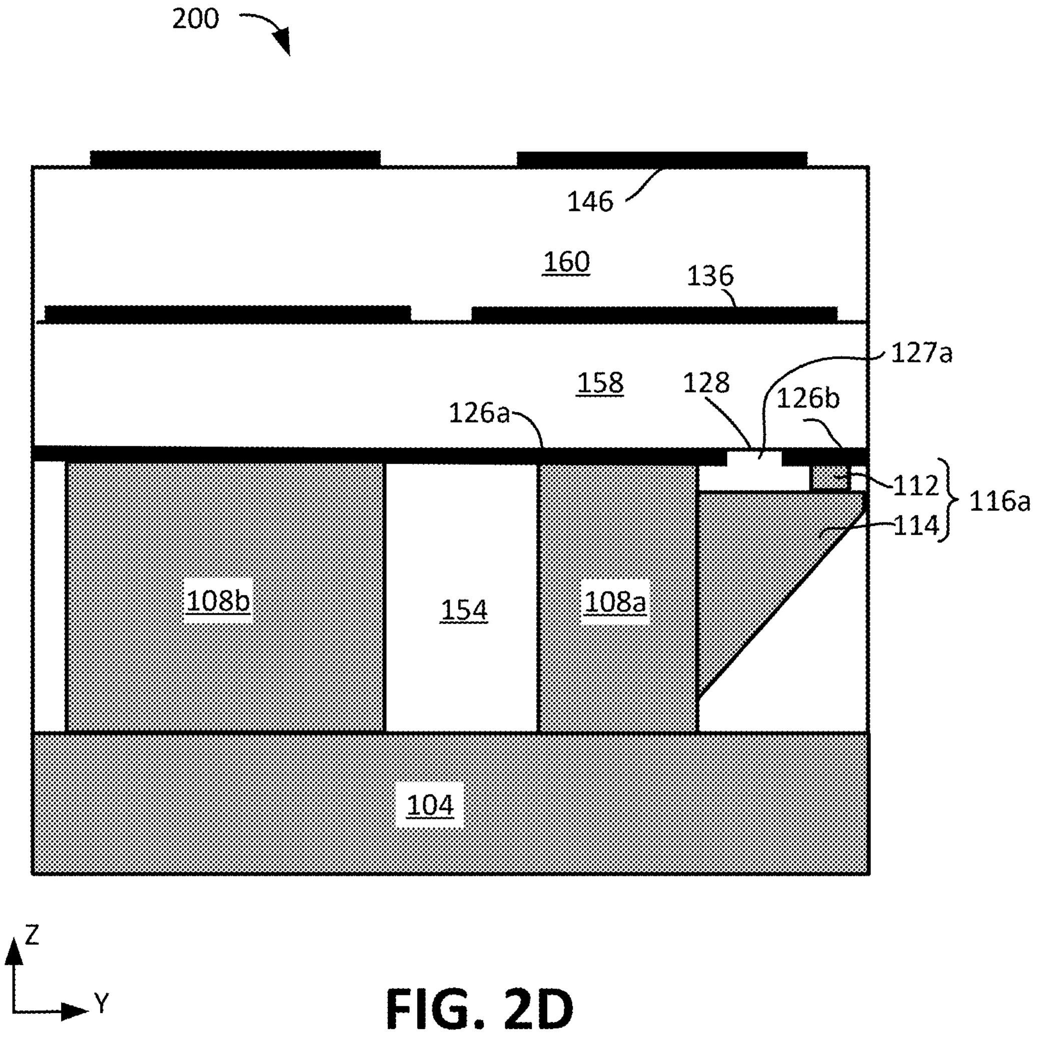

FIG. 2A illustrates an exploded view, FIG. 2B illustrates a perspective view, FIG. 2C illustrates a plan view, and FIG. 2D illustrates a cross-sectional view of an antenna array 200, in accordance with an embodiment of the present disclosure. As described above, the antenna array 200 comprises the antenna cell 100 of FIGS. 1A-1E.

The antenna array 200 comprises a plurality of ground shields and a corresponding plurality of feed lines, only some of which are labelled in FIG. 2A. For example, as labelled in FIG. 2A, the antenna array 200 comprises ground shields 108*a*, 108*b*, 108*c*, 108*d*, 108*e*, and corresponding feed lines 116*a*, 116*b*, 116*c*, 116*d*, 116*e*, where a ground shield 108 partially wraps around a corresponding feed line, as also described above with respect to FIGS. 1A-1E.

Each feed line 116 (such as a body 114 of each feed line) is on a corresponding vertical plane, and vertical planes of two feed lines can be substantially parallel to each other or substantially orthogonal to each other. For example, the vertical planes of feed lines 116*a* and 116*c* are parallel to each other, and the vertical planes of feed lines 116*b* and 116*d* are substantially parallel to each other, as illustrated in FIGS. 2A and 2C.

In an example, the vertical planes of feed lines 116*a* and 116*c* are substantially colinear, as illustrated in FIG. 2E. For example, an imaginary straight line passing through the vertical plane of feed line 116*a* also passes through the vertical plane of feed line 116*c*. Similarly, the vertical planes of feed lines 116*b* and 116*d* are substantially colinear.

On the other hand, the vertical planes of feed lines 116*a* and 116*b* are substantially orthogonal to each other. For example, the vertical planes of feed line 116*a* extend substantially along a direction of the Y axis, and the vertical planes of feed line 116*b* extend substantially along a direction of the X axis in FIGS. 2A and 2C. In an example, the feed lines 116*a* and 116*b* form a unit cell of the antenna array 200, as also described above with respect to FIG. 1E. Similarly, the vertical planes of feed lines 116*c* and 116*d* are substantially orthogonal to each other.

As illustrated in FIG. 2C, a conductive element 126 may be above one or more ground shields and/or one or more feed lines. For example, the conductive element 126*a* is above, and in contact with, the ground shields 108*a* and 108*b*, and feed lines 116*a* and 116*d*.

In one embodiment, individual antenna cells, as well as the antenna array may have a plane of symmetry 204. For example, FIG. 2C illustrates a dashed line, and a vertical plane extending through the dashed line forms the plane of symmetry 204 for the antenna array 200.

The cross-sectional view of FIG. 2D is along the line C-C' of FIG. 2A, and illustrates the ground shields 108*a* and 108*b* (thus, FIG. 2D illustrates only a section of the antenna array 200). The feed line 116*b* is not illustrated in FIG. 2D, for being obscured by the ground shield 108*b* in the cross-sectional view of FIG. 2D. A width of the ground shield 108*b* appears to be higher (e.g., substantially double) than that of the ground shield 108*a*, as an entire wall of the ground shield 108*b* is visible in the cross-sectional view of FIG. 2D, while only half of a wall of the ground shield 108*a* is visible in the cross-sectional view of FIG. 2D. The various conductive elements 126 and the various conductive components 136 and 146 in FIG. 2D (as well as in FIGS. 1C and 1D) are illustrated using thick solid lines.

Method of Manufacturing

Figure 3:
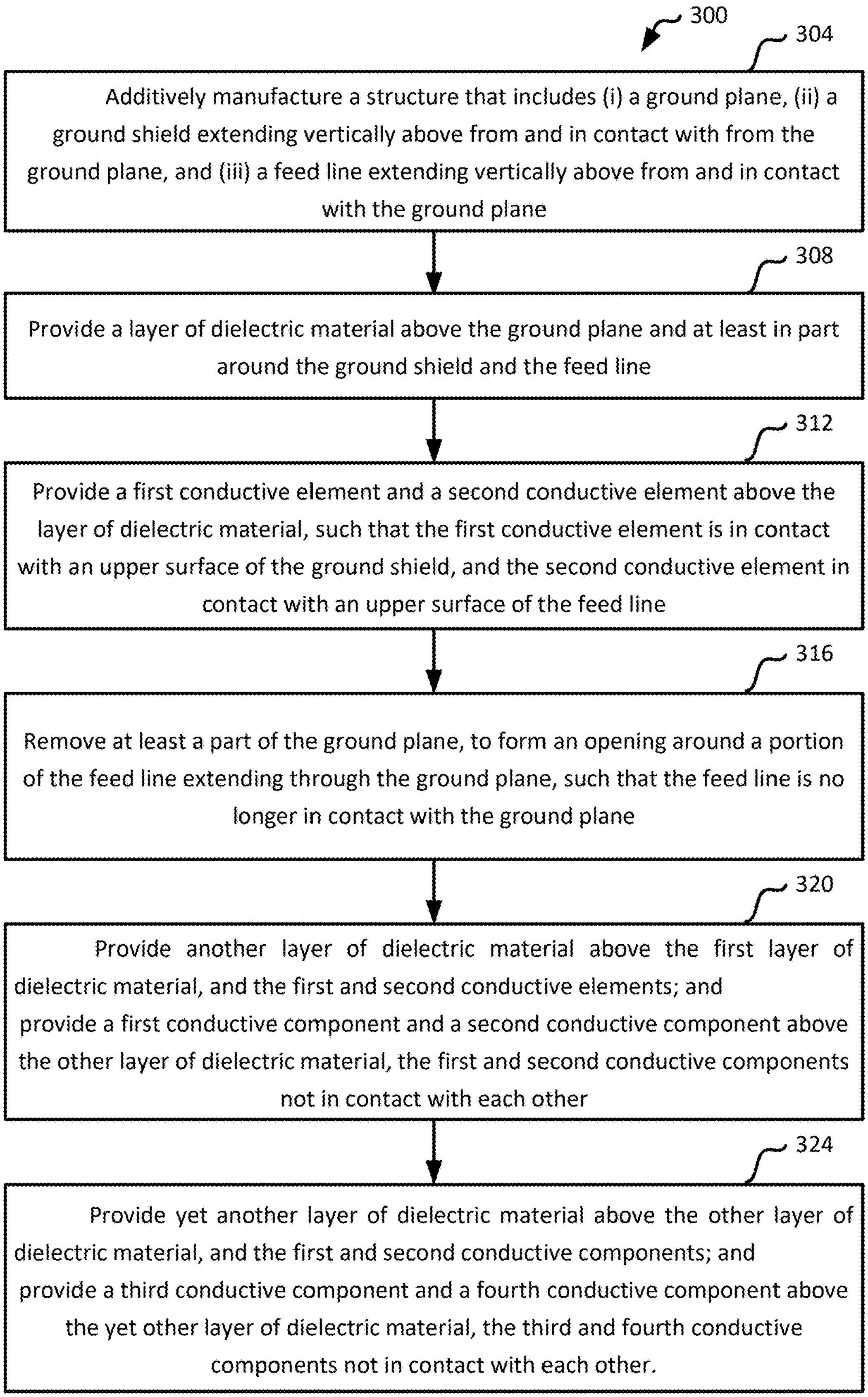
FIG. 3 illustrate a flowchart depicting a method of forming an example antenna assembly, in accordance with an embodiment of the present disclosure.

FIG. 3 illustrate a flowchart depicting a method 300 of forming an example antenna assembly (such as any of the antenna assemblies described above), in accordance with an embodiment of the present disclosure. FIGS. 4A, 4B, 4C, 4D, 4E, and 4F collectively illustrate an example antenna assembly 400 in various stages of processing in accordance with the methodology 300 of FIG. 3, in accordance with an embodiment of the present disclosure. FIGS. 3 and 4A-4F will be discussed in unison.

Note that the method 300 FIGS. 4A-4F describe formation of a single ground shield 108*a* and a corresponding single feed line 116*a*, e.g., the section 10 of the antenna cell 100 of FIGS. 1A-1E. However, the method 300 may be expanded to form multiple ground shields and corresponding multiple feed lines above the ground plane 104, as would be appreciated in view of FIGS. 1A-2D described above.

Figure 4A:
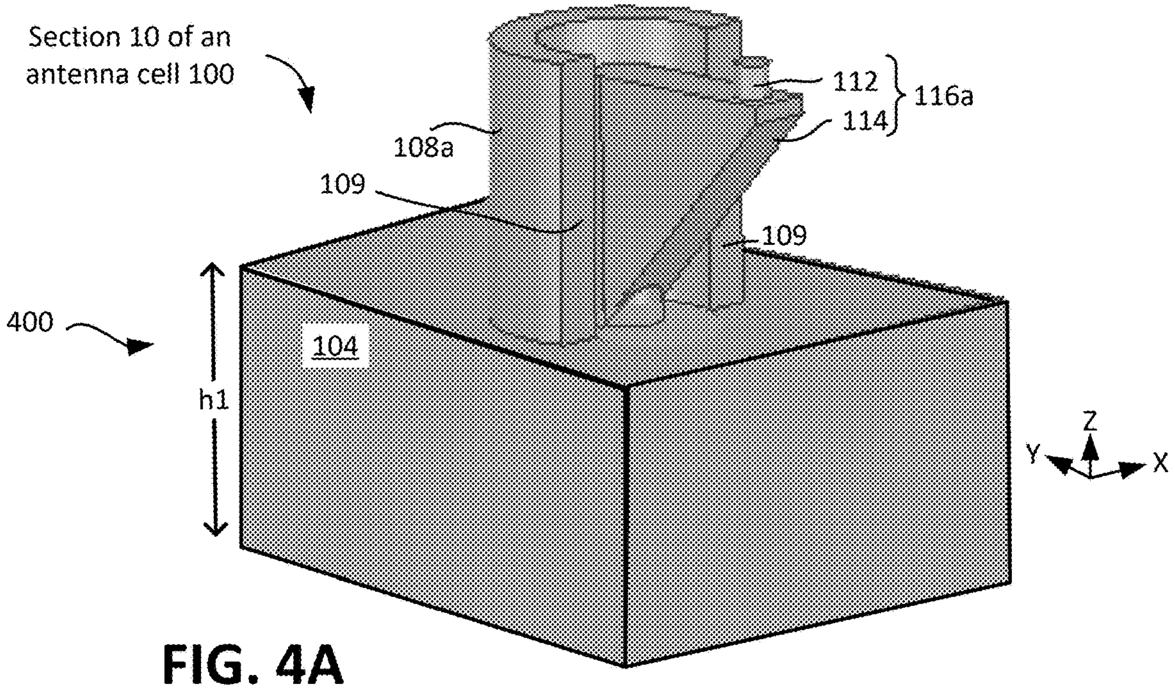
FIGS. 4A, 4B, 4C, 4D, 4E, and 4F collectively illustrate an example antenna assembly in various stages of processing in accordance with the methodology of FIG. 3, in accordance with an embodiment of the present disclosure.

At 304 of the method 300, a structure 400 is additively manufactured, where the structure 400 includes (i) a ground plane 104, (ii) a ground shield 108*a* extending vertically above from and in contact with from the ground plane 104, and (iii) a feed line 116*a* extending vertically above from and in contact with the ground plane 104, as illustrated in FIG. 4A. Thus, at this stage of the method 400, the feed line 116*a* is in contact with the ground plane 104. Also, note that at this stage of the method 400, the ground plane 104 has a height of h1.

In an example, the structure 400 is continuous and monolithic, and comprises a conductive material, such as one or more metals and/or alloys thereof (or a non-metal coated by a metal). The structure 400 being a monolithic and continuous structure implies that any section of the structure 400 is conjoined (e.g., physically joined) with any other section of the structure 400 via one or more intervening sections. Thus, the structure 400 is a single integral conductive structure that has been additively manufactured.

In an example, additively manufacturing the structure 400 may include using any appropriate additive manufacturing techniques to form the structure 400. For example, additively manufacturing the structure 400 may include printing the structure 400 using a 3D printer. Additive manufacturing, such as 3D printing, uses computer-aided-design (CAD) software and/or 3D object scanners to direct hardware to deposit material, layer upon layer, in precise geometric shapes. As its name implies, additive manufacturing adds material to create an object. Thus, additive manufacturing involves a computer controlled process that creates 3D objects, such as the structure 400, by depositing materials, usually in layers.

Figure 4B:
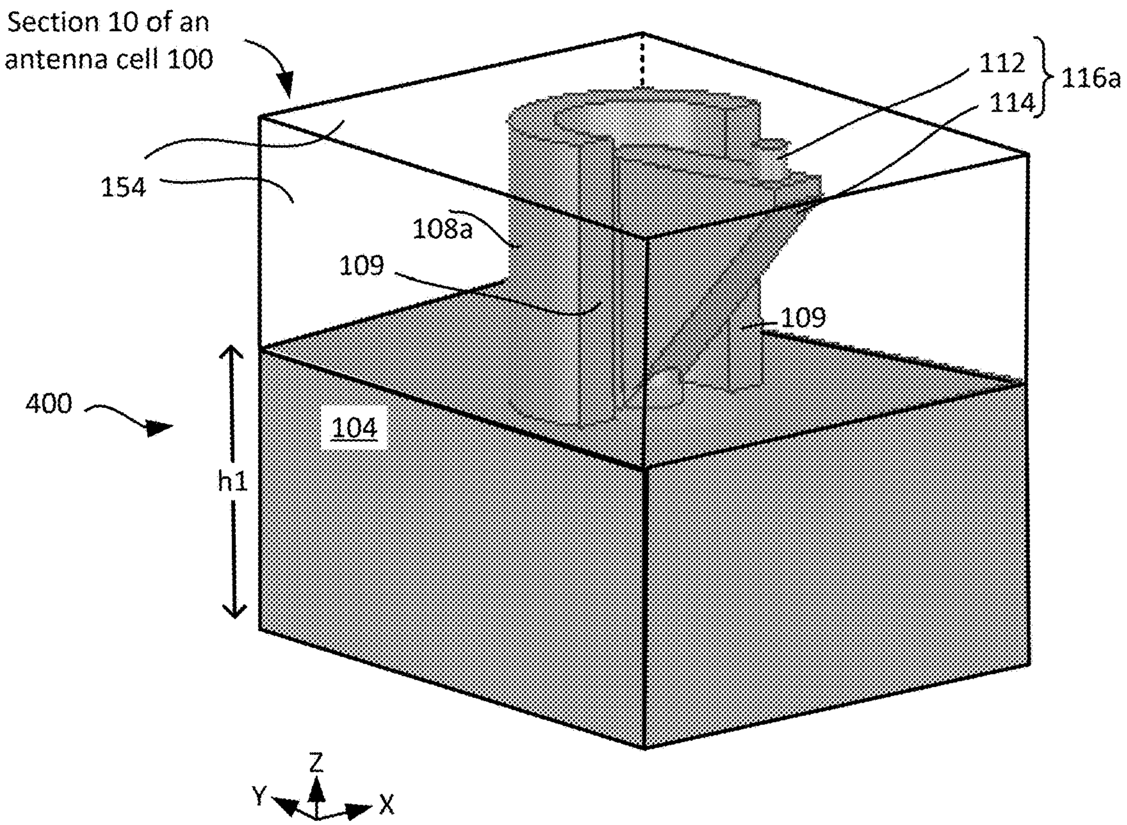

The method 300 proceeds from 304 to 308. At 308, a layer of dielectric material 154 is provided above the ground plane 104, and at least in part around the ground shield 108*a* and the feed line 116*a*, as illustrated in FIG. 4B. The dielectric material 154 is illustrated as being transparent in FIG. 4B, to illustrate various portions of the structure 400 covered by the dielectric material 154, although the dielectric material 154 need not be transparent.

In an example, the layer of dielectric material 154 may be additively formed. For example, the layer of dielectric material 154 comprising dielectric foam may be provided above the ground plane 104 using any appropriate foaming technique. Merely as an example, during the foaming process, a mixture of an activator and a foaming portion may be deposited above the ground plane 104, and then the foaming mixture may be cured at an appropriate temperature, such that rigid foam forms from the activator and the foaming portion. In another example, a foaming gel or solution may be applied above the ground plane 104 and then cured, such that rigid foam forms above the ground plane 104. In yet another example, a foaming power (e.g., comprising microspheres including resins or another appropriate material) is applied and then cured at an appropriate temperature, such that the foaming power transforms to the rigid dielectric foam of the layer of dielectric material 154. Any appropriate foaming process can be used, and the selection of the foaming process and/or the selection of an appropriate type of foam may be implementation specific. In another example, another additive manufacturing technique (such as a 3D printing process, or a ceramic dielectric material formation process, or another appropriate dielectric material deposition process) may be employed to form the layer of dielectric material 154.

In one embodiment, upper surfaces of the ground shield 108*a* and the extension 112 of the feed line 116*a* are exposed through an upper surface of the layer of dielectric material 154. In an example, the layer of dielectric material 154 may be formed to cover the upper surfaces of the ground shield 108*a* and the extension 112. Subsequently, the upper portion of the layer of dielectric material 154 may be planarized and at least in part etched away, until the upper surfaces of the ground shield 108*a* and the extension 112 of the feed line 116*a* are exposed through the layer of dielectric material 154. In another example, the formation process of the layer of dielectric material 154 is controlled, such that the layer of dielectric material 154 extends up to the upper surfaces of the ground shield 108*a* and the extension 112 of the feed line 116*a*.

Figure 4C:
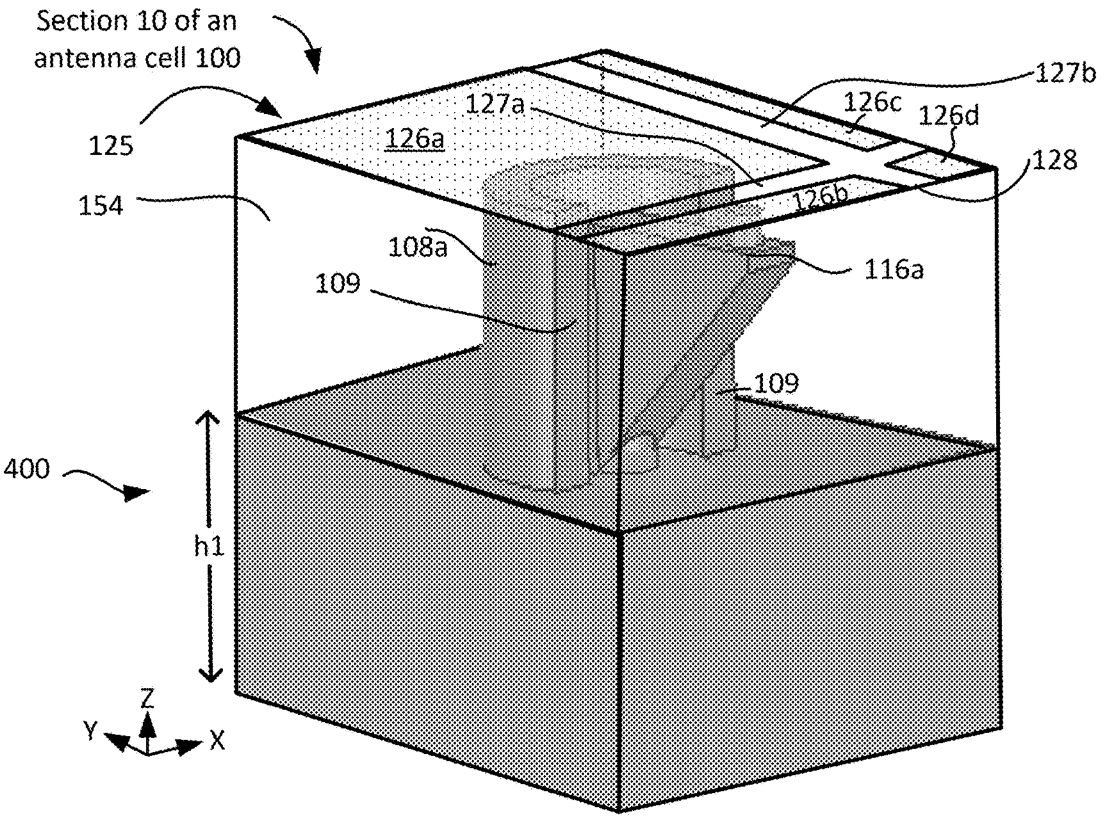

The method 300 then proceeds from 308 to 312. At 312, a first conductive element 126*a* and a second conductive element 126*b* are provided above the layer of dielectric material 154, such that the first conductive element 126*a* is in contact with an upper surface of the ground shield 108*a*, and the second conductive element 126*b* in contact with an upper surface of the feed line 116, as illustrated in FIG. 4C. For example, conductive material may be deposited using an appropriate additive manufacturing process above the layer of dielectric material 154, the ground shield 108*a*, and the feed line 116*a*, to provide the first conductive element 116*a* and the second conductive element 116*b*. An appropriate conductive material deposition technique may be used, such as an additive metal or an alloy deposition process, and may include 3D printing, metal ink printing, or simply attaching (such as attaching using an adhesive) pre-formed conductive elements 126 on the dielectric material 154. As describe above, the conductive elements 126 are not in contact with each other, with corresponding slots 127 between adjacent conductive elements 126.

Figure 4D:
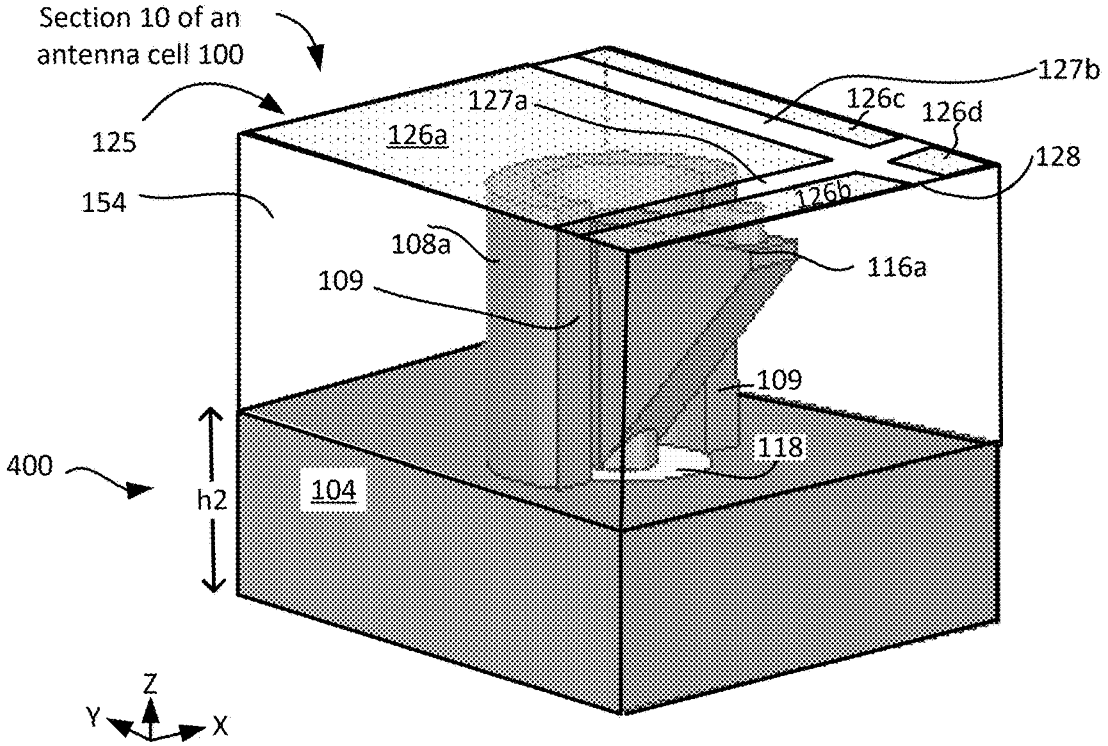

The method 300 then proceeds from 312 to 316. At 316, at least a part of the ground plane 104 is removed, to form an opening 118 around a portion (such as a lower portion) of the feed line 116*a* extending through the ground plane 104, such that the feed line 116*a* is no longer in contact with the ground plane 104, as illustrated in FIG. 4D. For example, the ground plane 104 may be machined or drilled (from a lower surface of the ground plane 104), to remove or etch away portions of the ground plane 104.

In an example, a lower section of the ground plane 104 may be sacrificial in nature, e.g., intended to provide structural stability to the structure 400, while various processes of the method 300 is performed. In one embodiment, such sacrificial lower section of the ground plane 104 may also be removed at process 316, resulting in a reduction of a height of the ground plane 104 from height h1 in FIG. 4A to a reduced height h2 in FIG. 4D.

Figure 4E:
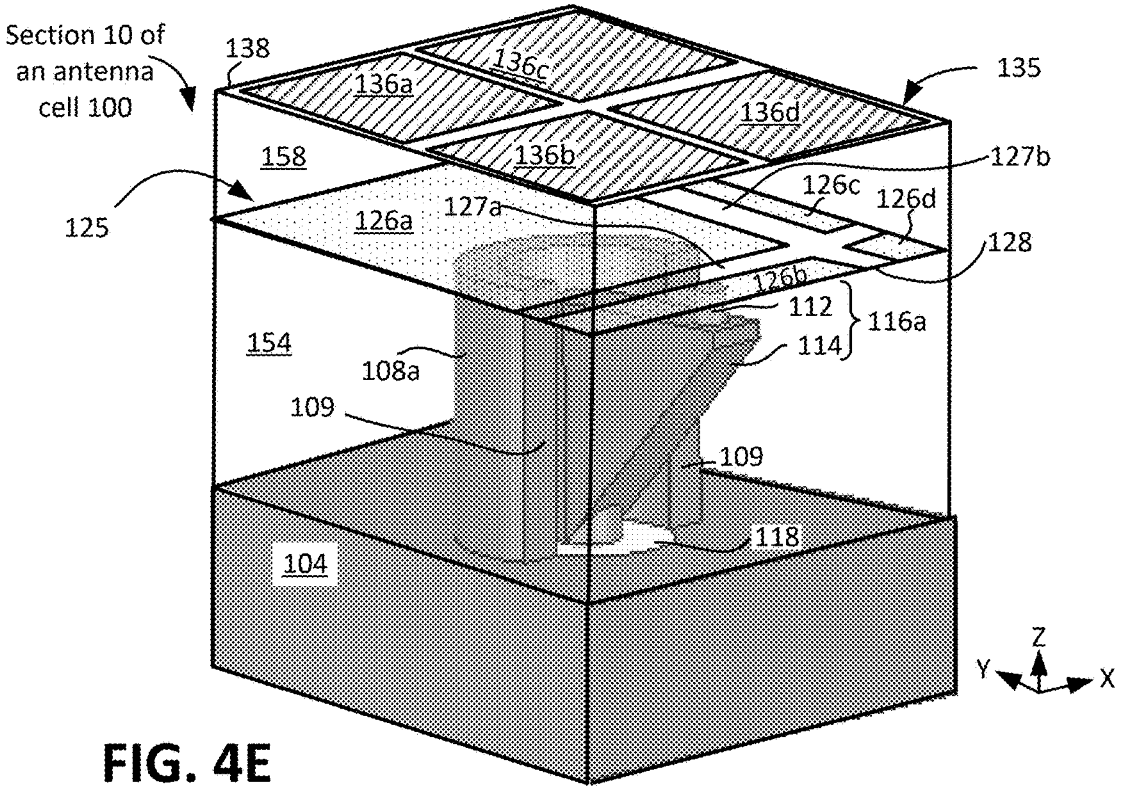

The method 300 then proceeds from 316 to 320. At 320, another layer of dielectric material 158 is provided above the layer of dielectric material 154, and the first and second conductive elements 126*a*, 126*b*; and a first conductive component 136*a* and a second conductive component 136*b* are provided above the other layer of dielectric material 158, wherein the first and second conductive components 136*a*, 136*b* not in contact with each other, e.g., as illustrated in FIG. 4E. In an example, providing the layer of dielectric material 158 may be similar to the above described providing of the layer of dielectric material 154. In an example, formation of the first and second conductive components 136*a*, 136*b* may be similar to the above described formation of the conductive elements 126*a*, 126*b*.

Figure 4F:
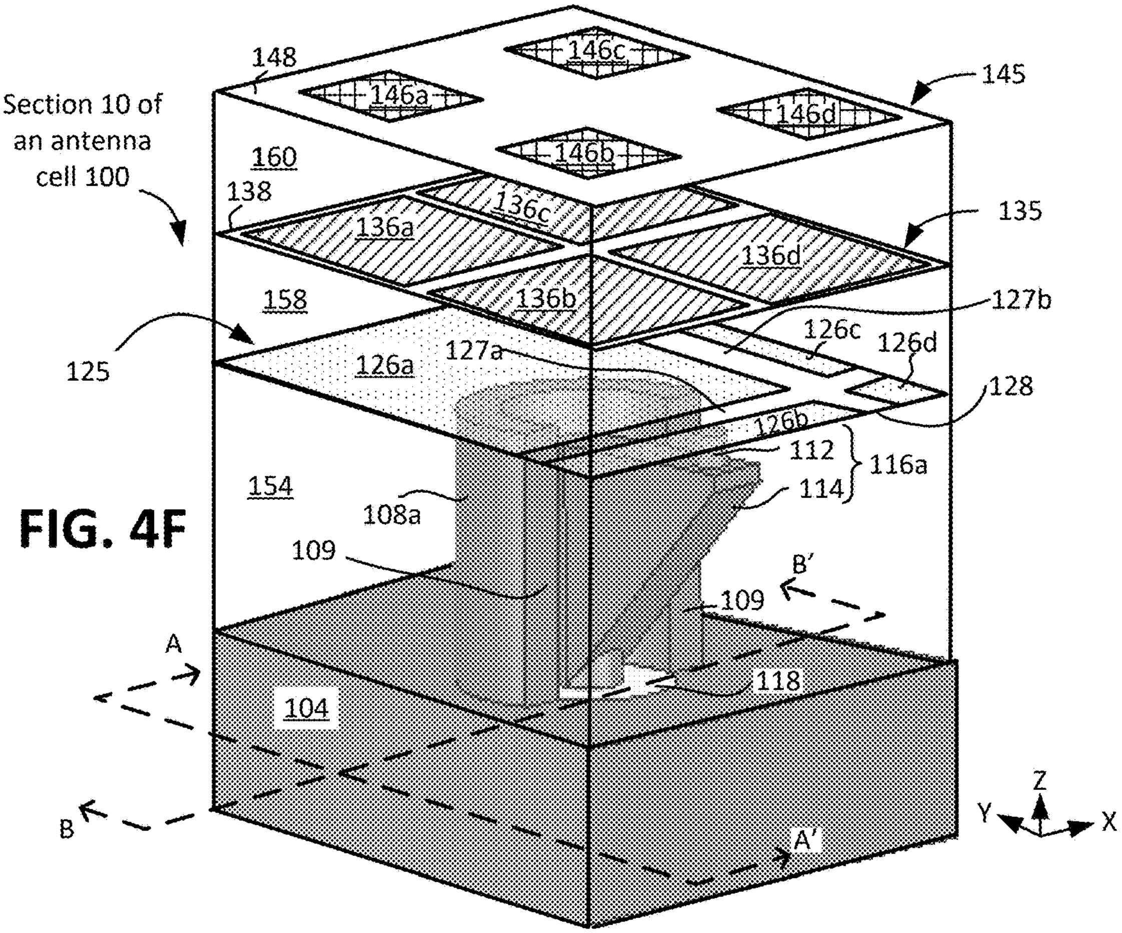

The method 300 then proceeds from 320 to 324. At 324, yet another layer of dielectric material 160 is provided above the other layer of dielectric material 158, and the first and second conductive components 136*a*, 136*b*; and a third conductive component 146*a* and a fourth conductive component 146*b* are provided above the yet other layer of dielectric material 160, wherein the third and fourth conductive components 146*a*, 146*b* not in contact with each other, e.g., as illustrated in FIG. 4F. In an example, providing the layer of dielectric material 160 may be similar to the above described providing of the layer of dielectric material 154. In an example, formation of the third and fourth conductive components 146*a*, 146*b* may be similar to the above described formation of the conductive elements 126*a*, 126*b*.

Note that the processes in method 300 are shown in a particular order for ease of description. However, one or more of the processes may be performed in a different order or may not be performed at all (and thus be optional), in accordance with some embodiments. For example, process 316 to remove portion of the ground plane 104 may be performed between processes 312 320 (as described with respect to FIG. 3), or between processes 320 and 324, or subsequent to process 324. Numerous variations of method 300 and the techniques described herein will be apparent in light of this disclosure.

Further Example Examples

The following examples pertain to further examples, from which numerous permutations and configurations will be apparent.

Example 1. An antenna assembly comprising: a conductive ground plane; a ground shield extending vertically above from the ground plane; a feed line extending vertically upwards from an opening within the ground plane, without contacting the ground plane; and a first conductive element in contact with an upper surface of the ground shield, and a second conductive element in contact with an upper surface of the feed line, with a slot between the first conductive element and the second conductive element.

Example 2. The antenna assembly of example 1, wherein the ground shield and the ground plane form a monolithic structure, without an interface between the ground shield and the ground plane.

Example 3. The antenna assembly of any one of examples 1-2, wherein the ground shield comprises a continuous wall, the wall comprising conductive material and partially wrapping around the feed line.

Example 4. The antenna assembly of any one of examples 1-3, wherein the ground shield is a first ground shield, the feed line is a first feed line, the opening is a first opening, the slot is a first slot, and wherein the antenna assembly further comprises: a second ground shield extending vertically above from the ground plane, wherein an upper surface of the second ground shield is in contact with the first conductive element; a second feed line extending vertically upwards from a second opening within the ground plane, without contacting the ground plane, wherein the second ground shield comprises a continuous wall comprising conductive material that partially wraps around the second feed line; and a third conductive element in contact with an upper surface of the second feed line, with a second slot between the first conductive element and the third conductive element.

Example 5. The antenna assembly of example 4, wherein the first feed line is on a first vertical plane, and the second feed line is on a second vertical plane that is orthogonal to the first vertical plane, and wherein the first slot and the second slot are connected to each other.

Example 6. The antenna assembly of any one of examples 4-5, wherein the first, second, and third conductive elements are at least in part coplanar, and at least in part on a horizontal plane that is substantially parallel to the ground plane.

Example 7. The antenna assembly of any one of examples 1-6, wherein: a first section of the feed line is below the first conductive element, a second section of the feed line is below the second conductive element, and a third section of the feed line is below the slot between the first conductive element and the second conductive element; and at least a portion of the second section of the feed line is in contact with the second conductive element.

Example 8. The antenna assembly of any one of examples 1-7, wherein the feed line comprises: a body having a triangular or cantilevered shape, such that (i) the body extends from below the first conductive element to below the second conductive element, without making contact with the first and second conductive elements, and (ii) a lower portion of the body extends through the opening within the ground plane; and an extension portion having a lower surface in contact with a section of the body that is below the second conductive element, wherein an upper surface of the extension portion is in contact with the second conductive element.

Example 9. The antenna assembly of any one of examples 1-8, further comprising: an impedance matching layer above the first and second conductive elements, wherein the impedance matching layer comprises a first conductive component and a second conductive component that are not in contact with each other, wherein at least one of the first or second conductive components is at least in part above the ground shield and/or the feed line.

Example 10. The antenna assembly of any one of examples 1-9, wherein: the first and second conductive elements are at least in part coplanar, and at least in part on a first horizontal plane that is substantially parallel to the ground plane and separated from the ground plane by a first layer of dielectric material; and the first and second conductive components are at least in part coplanar, and at least in part on a second horizontal plane that is substantially parallel to the first horizontal plane and the ground plane, and separated from the first horizontal plane by a second layer of dielectric material.

Example 11. A method of manufacturing an antenna assembly, the method comprising: additively manufacturing a continuous and monolithic structure that includes (i) a ground plane, (ii) a ground shield extending vertically above from and in contact with from the ground plane, and (iii) a feed line extending vertically above from and in contact with the ground plane; providing a layer of dielectric material above the ground plane and at least in part around the ground shield and the feed line; providing a first conductive element and a second conductive element above the layer of dielectric material, such that the first conductive element is in contact with an upper surface of the ground shield, and the second conductive element in contact with an upper surface of the feed line; and removing at least a part of the ground plane, to form an opening around a portion of the feed line extending through the ground plane, such that the feed line is no longer in contact with the ground plane.

Example 12. The method of example 11, wherein additively manufacturing the structure comprises printing the structure using a three-dimensional (3D) printing process.

Example 13. The method of any one of examples 11-12, wherein providing the layer of dielectric material comprises providing the layer of dielectric material using a dielectric material foaming process.

Example 14. The method of any one of examples 11-13, wherein the ground shield comprises a continuous wall, the wall comprising conductive material partially wrapping around the feed line.

Example 15. The method of any one of examples 11-14, wherein the first conductive element and the second conductive element are on a same horizontal plane, with a slot between the first conductive element and the second conductive element.

Example 16. The method of any one of examples 11-15, wherein providing the first conductive element and the second conductive element comprises: depositing conductive material using an additive manufacturing process above the layer of dielectric material, the ground shield, and the feed line, to provide the first conductive element and the second conductive element.

Example 17. The method of any one of examples 11-16, wherein the layer of dielectric material is a first layer of dielectric material, and wherein the method further comprises: providing a second layer of dielectric material above the first layer of dielectric material, and the first and second conductive elements; providing a first conductive component and a second conductive component above the second layer of dielectric material, the first and second conductive components not in contact with each other; providing a third layer of dielectric material above the second layer of dielectric material, and the first and second conductive components; and providing a third conductive component and a fourth conductive component above the third layer of dielectric material, the third and fourth conductive components not in contact with each other.

Example 18. An antenna assembly comprising: a conductive ground plane; a ground shield extending vertically above from the ground plane, wherein the ground shield comprises a continuous wall of conductive material, and wherein the ground shield and the ground plane form a monolithic structure, without an interface between the ground shield and the ground plane; and a conductive element in contact with an upper surface of the ground shield, the conductive element extending in a direction substantially parallel to the ground plane.

Example 19. The antenna assembly of example 18, further comprising: a feed line extending vertically upwards from an opening within the ground plane, without contacting the ground plane, wherein the wall of the ground shield partially wraps around the feed line.

Example 20. The antenna assembly of any one of examples 18-19, wherein the conductive element is a first conductive element, and wherein the antenna assembly further comprises: a second conductive element in contact with an upper surface of the feed line, with a slot between the first conductive element and the second conductive element, wherein the second conductive element extends in the direction substantially parallel to the ground plane.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. Furthermore, examples described herein may include other elements and components not specifically described, such as electrical connections, signal transmitters and receivers, processors, or other suitable components for operation of the antenna assembly described above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An antenna assembly comprising:

a conductive ground plane;

a ground shield extending vertically above from the ground plane;

a feed line extending vertically upwards from an opening within the ground plane, without contacting the ground plane; and a first conductive element in contact with an upper surface of the ground shield, and a second conductive element in contact with an upper surface of the feed line, with a slot between the first conductive element and the second conductive element;

wherein the ground shield is a first ground shield, the feed line is a first feed line, the opening is a first opening, the slot is a first slot, and wherein the antenna assembly further comprises:

a second ground shield extending vertically above from the ground plane, wherein an upper surface of the second ground shield is in contact with the first conductive element;

a second feed line extending vertically upwards from a second opening within the ground plane, without contacting the ground plane, wherein the second ground shield comprises a continuous wall comprising conductive material that partially wraps around the second feed line; and a third conductive element in contact with an upper surface of the second feed line, with a second slot between the first conductive element and the third conductive element.

2. The antenna assembly of claim 1, wherein the ground shield and the ground plane form a monolithic structure, without an interface between the ground shield and the ground plane.

3. The antenna assembly of claim 1, wherein the ground shield comprises a continuous wall, the wall comprising conductive material and partially wrapping around the feed line.

4. The antenna assembly of claim 1, wherein the first feed line is on a first vertical plane, and the second feed line is on a second vertical plane that is orthogonal to the first vertical plane, and wherein the first slot and the second slot are connected to each other.

5. The antenna assembly of claim 1, wherein the first, second, and third conductive elements are at least in part coplanar, and at least in part on a horizontal plane that is substantially parallel to the ground plane.

6. The antenna assembly of claim 1, wherein:

a first section of the feed line is below the first conductive element, a second section of the feed line is below the second conductive element, and a third section of the feed line is below the slot between the first conductive element and the second conductive element; and at least a portion of the second section of the feed line is in contact with the second conductive element.

7. The antenna assembly of claim 1, wherein the feed line comprises:

a body having a triangular or cantilevered shape, such that (i) the body extends from below the first conductive element to below the second conductive element, without making contact with the first and second conductive elements, and (ii) a lower portion of the body extends through the opening within the ground plane; and an extension portion having a lower surface in contact with a section of the body that is below the second conductive element, wherein an upper surface of the extension portion is in contact with the second conductive element.

8. The antenna assembly of claim 1, further comprising:

an impedance matching layer above the first and second conductive elements, wherein the impedance matching layer comprises a first conductive component and a second conductive component that are not in contact with each other, wherein at least one of the first or second conductive components of the impedance matching layer is supported above an aperture layer by a dielectric material such that the first or second conductive components is disposed above both the ground shield and the feed line.

9. The antenna assembly of claim 8, wherein:

the first and second conductive elements are at least in part coplanar, and at least in part on a first horizontal plane that is substantially parallel to the ground plane and separated from the ground plane by a first layer of dielectric material; and the first and second conductive components are at least in part coplanar, and at least in part on a second horizontal plane that is substantially parallel to the first horizontal plane and the ground plane, and separated from the first horizontal plane by a second layer of dielectric material.

10. An antenna assembly comprising:

a conductive ground plane;

a ground shield extending vertically above from the ground plane, wherein the ground shield comprises a continuous wall of conductive material, and wherein the ground shield and the ground plane form a monolithic structure, without an interface between the ground shield and the ground plane; and a feed line extending vertically upwards from an opening within the ground plane, without contacting the ground plane, a first conductive element in contact with an upper surface of the ground shield, the first conductive element extending in a direction substantially parallel to the ground plane, and a second conductive element in contact with an upper surface of the feed line, wherein the feed line comprises: a body having a triangular or cantilevered shape, such that (i) the body extends from below the first conductive element to below the second conductive element, without making contact with the first and second conductive elements, and (ii) a lower portion of the body extends through the opening within the ground plane; and an extension portion having a lower surface in contact with a section of the body that is below the second conductive element, wherein an upper surface of the extension portion is in contact with the second conductive element.

11. The antenna assembly of claim 10, wherein the wall of the ground shield partially wraps around the feed line.

12. The antenna assembly of claim 10, wherein the second conductive element in contact with an upper surface of the feed line, with a slot between the first conductive element and the second conductive element, wherein the second conductive element extends in the direction substantially parallel to the ground plane.

* * * * *